United States Patent
Mehrer et al.

(10) Patent No.: US 8,446,284 B2
(45) Date of Patent: May 21, 2013

(54) LOW OIL INDICATION

(75) Inventors: Michael E. Mehrer, San Diego, CA (US); André M. Ajami, Spring Valley, CA (US)

(73) Assignee: Pratt & Whitney, East Hartford, CT (US)

( * ) Notice: Subject to any disclaimer, the term of this patent is extended or adjusted under 35 U.S.C. 154(b) by 237 days.

(21) Appl. No.: 13/166,907

(22) Filed: Jun. 23, 2011

(65) Prior Publication Data

US 2012/0326880 A1    Dec. 27, 2012

(51) Int. Cl.
*G08B 21/00*     (2006.01)
*F16K 21/18*     (2006.01)
*G01F 23/00*     (2006.01)

(52) U.S. Cl.
USPC .................. 340/618; 137/392; 73/290 R

(58) Field of Classification Search
USPC .................. 340/618; 137/392; 73/290 R
See application file for complete search history.

(56) References Cited

U.S. PATENT DOCUMENTS

| | | | | |
|---|---|---|---|---|
| 5,548,278 A * | 8/1996 | Oliver et al. | ................. | 340/605 |
| 5,619,560 A * | 4/1997 | Shea | ..................... | 379/106.04 |
| 5,798,698 A * | 8/1998 | Politt et al. | .................. | 340/618 |
| 6,502,461 B2 * | 1/2003 | Keller | ........................... | 73/305 |
| 7,621,123 B2 * | 11/2009 | Jacobs et al. | .................. | 60/428 |
| 2010/0001867 A1* | 1/2010 | Rodrigue et al. | ............ | 340/618 |
| 2011/0156918 A1* | 6/2011 | Santos | ........................ | 340/622 |

OTHER PUBLICATIONS

Kmoturbo, Smart Level Monitoring, Jan. 29, 2011, http://www.kmo-turbo.de/downloads/02_en_kmo_slm_015_A4.pdf.*

* cited by examiner

*Primary Examiner* — Jennifer Mehmood
*Assistant Examiner* — Omar Casillashernandez
(74) *Attorney, Agent, or Firm* — Stephen G. Mican

(57) ABSTRACT

A method of indicating low oil level of lubrication oil for a gas turbine engine automatically eliminates false low oil readings due to temperature-induced lubrication oil shrinkage and operation-induced changes in lubrication oil level.

21 Claims, 2 Drawing Sheets

LOW OIL INDICATION

Figure 1:
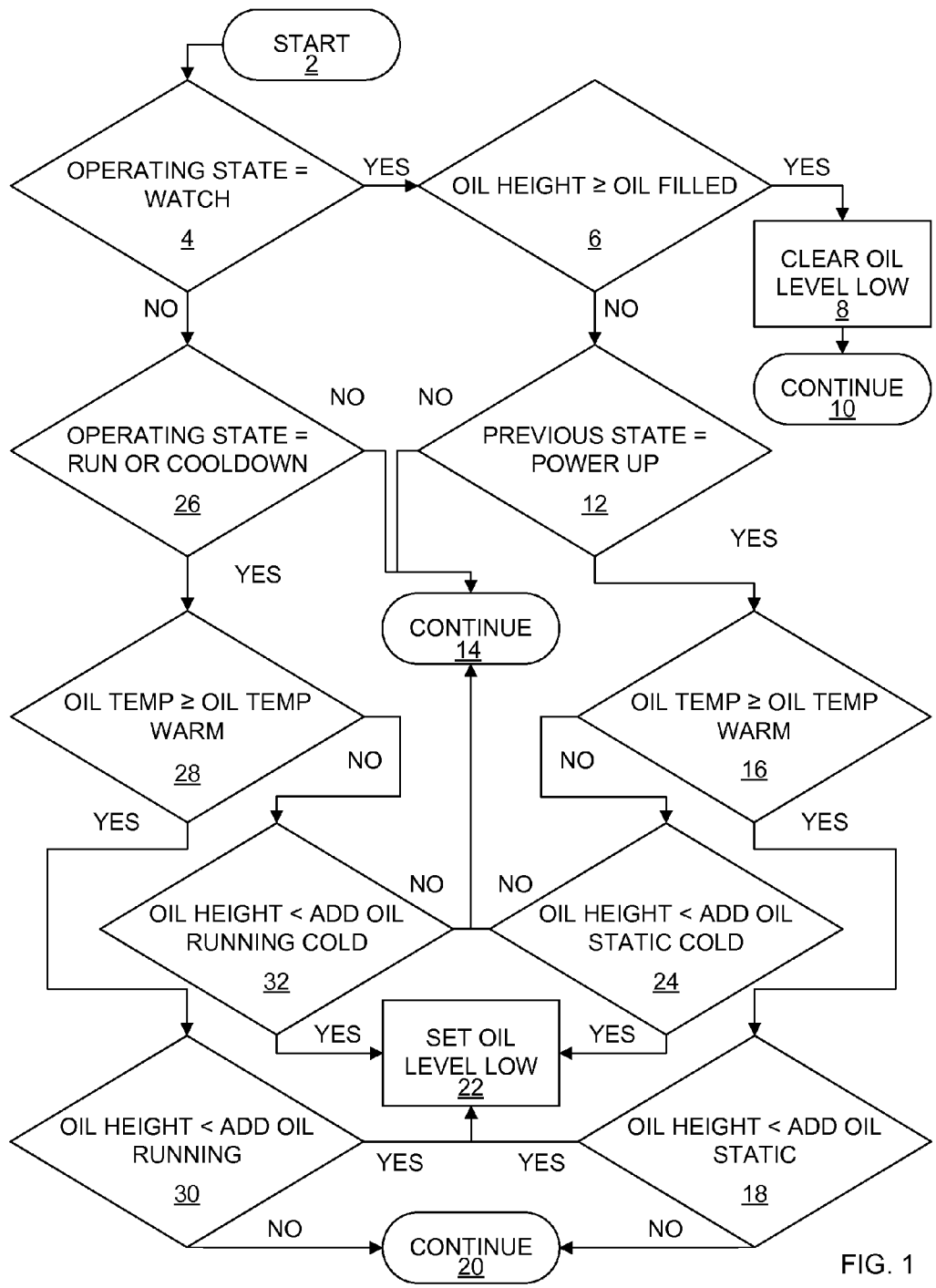
Figure 2:
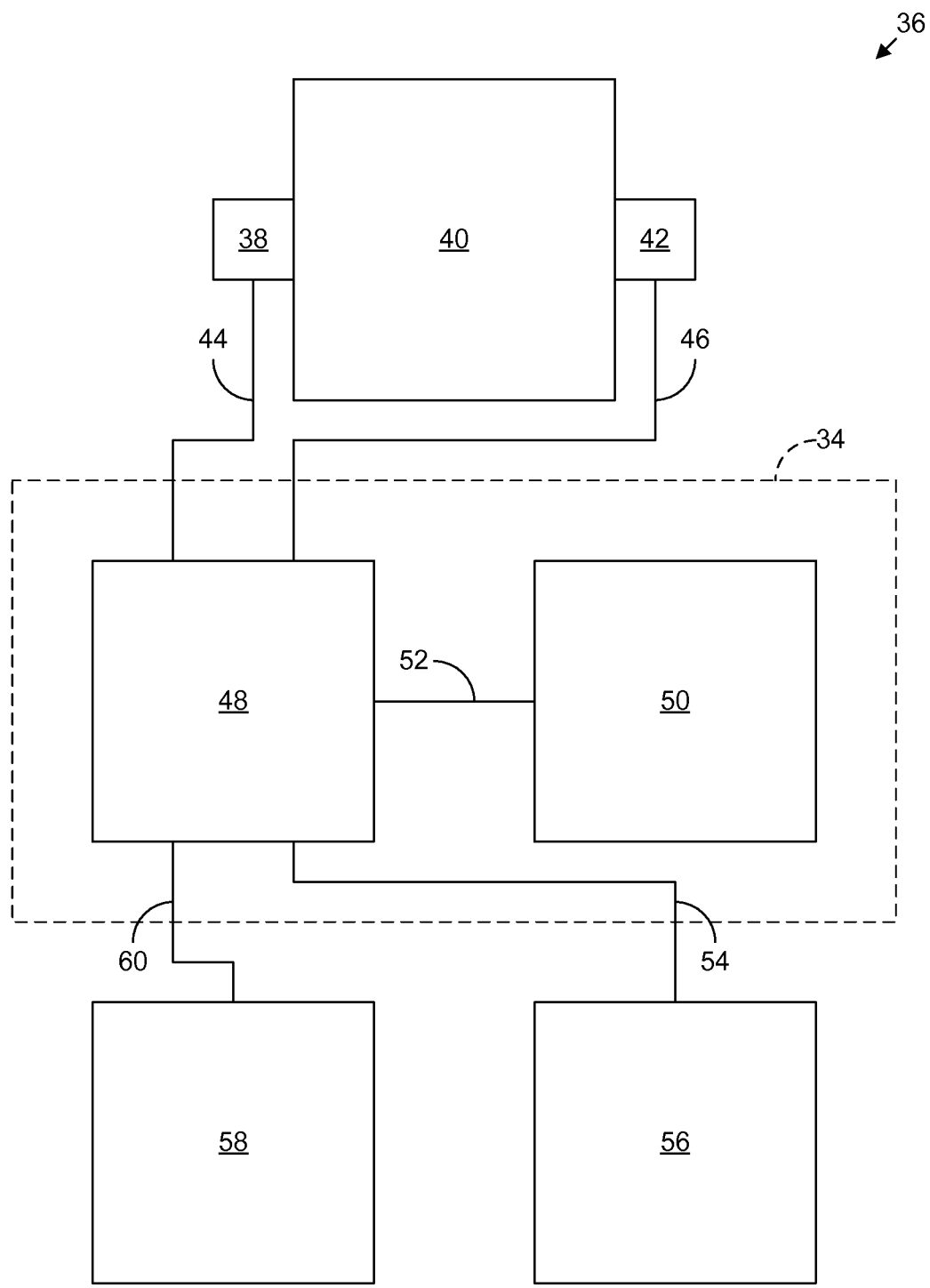

FIG. 1 is a flow chart that represents a method of indicating low oil level of lubrication oil for a gas turbine engine according to a possible embodiment. FIG. 2 is a high-level schematic diagram of a data processing system for implementing the method of indicating low oil level of lubrication oil for a gas turbine engine shown in FIG. 1.

The determination of a proper quantity of lubrication oil for a gas turbine engine generally involves measurement of the level of lubrication oil in its gearbox sump. Unfortunately, this level may change in response to normal changes in temperature of the lubrication oil as well as the operating state of the gas turbine engine.

The lubrication oil is subject to shrinkage with decreasing temperature. This shrinkage may be sufficient to lower the measured level of lubrication oil at low temperatures to a point that falsely indicates a low oil level that requires the addition of lubrication oil. The measured level of lubrication oil will also lower when the gas turbine engine is in its normal run and cooldown states of operation compared to its static states before and during power up due to circulation of the lubrication oil in the gas turbine engine in these states.

Additional changes in the measured level of lubrication oil may occur when the gas turbine engine is in the shutdown state of operation due to "windmilling" of the gas turbine engine, wherein an excessive amount of lubrication oil remains in its gearbox, and also due to "oil gulping", wherein an inconsistent quantity of oil may return to its gearbox. It is therefore necessary that the lubrication oil measurement process takes into account the shrinkage of lubrication oil due to temperature change, the difference in the level of lubrication oil between its run and cooldown states compared to its static states before and during power up as well as unreliable measurements of the lubrication oil level during the shutdown state.

The sequential states of operation of a gas turbine engine are generally describable as POWER UP, WATCH, during which state the gas turbine engine waits for a START command, RUN, during which the gas turbine engine may receive an OFF command, COOLDOWN, SHUTDOWN, and then again WATCH, during which state the gas turbine engine may receive another START command. For the described reasons, the measurement process should avoid or ignore measurement of the lubrication oil level during the SHUTDOWN state and should take into account the change in level during the RUN and COOLDOWN states compared to the POWER UP and WATCH states.

FIG. 1 is a flow chart that represents a method of indicating low oil level of lubrication oil for a gas turbine engine as described according to a possible embodiment. The method involves the setting or clearing of a LOW OIL LEVEL indicator that when set indicates that the gas turbine engine requires additional lubrication oil.

The first step of the method clears the LOW OIL LEVEL indicator if the oil level of the lubrication oil is at a level greater than or equal to an OIL FILLED level if the gas turbine engine is in the WATCH state. The OIL FILLED level represents the level of lubrication oil that is greater than a static low oil level by an amount that corresponds to the maximum consumption of lubrication oil during a recommended period between lubrication oil servicing of the gas turbine engine. Adding lubrication oil to the gearbox of the gas turbine engine in order to clear the LOW OIL LEVEL indicator addresses nuisance low oil level indications due to lubrication oil hiding during the SHUTDOWN state. Referring to FIG. 1, beginning in a START block 2, a decision block 4 determines if the operating state of the gas turbine engine is in the WATCH state. If it is, a decision block 6 determines if the oil level of the lubrication oil is at a height greater than or equal to the OIL FILLED level. If it is, a process block 8 clears the LOW OIL LEVEL indicator and the step proceeds to a CONTINUE block 10.

The second step of the method sets the LOW OIL LEVEL indicator if the temperature of the lubrication oil is greater than or equal to an OIL TEMP WARM temperature and the oil level of the lubrication oil is less than an ADD OIL STATIC level if the gas turbine engine is in the WATCH state and its previous state was a POWER UP state. The OIL TEMP WARM temperature generally represents a normal operating temperature of the oil. This step only responds to measurements of the lubrication oil level during the WATCH state that follow the POWER UP state, thereby eliminating unreliable measurements that may occur following the SHUTDOWN state. Referring to FIG. 1, a decision block 12 determines if the previous state of the gas turbine engine was the POWER UP state whilst it is in the WATCH state. If it was not, the step proceeds to a CONTINUE block 14. If it was, a decision block 16 determines if the temperature of the lubrication oil is greater than or equal to the OIL TEMP WARM temperature. If it is, a decision block 18 determines if the oil level of the lubrication oil is at a height less than the ADD OIL STATIC level. If it is not, the step proceeds to a CONTINUE block 20. If it is, a process block 22 sets the OIL LEVEL LOW indicator.

The third step of the method sets the LOW OIL LEVEL indicator if the temperature of the lubrication oil is less than the OIL TEMP WARM temperature and the oil level of the lubrication oil is less than an ADD OIL STATIC COLD level if the gas turbine engine is in the WATCH state and its previous state was the POWER UP state. This step recognises that the measured oil level will be lower than the second step due to shrinkage of the lubrication oil with decreasing temperature, that is, below the temperature of OIL TEMP WARM. Again, this step only responds to measurements of the lubrication oil level during the WATCH state that follow the POWER UP state, thereby eliminating unreliable measurements that may occur following the SHUTDOWN state. Referring to FIG. 1, a decision block 24 determines if the oil level of the lubrication oil is less than the ADD OIL STATIC COLD level if the gas turbine engine is in the WATCH state, its previous state was the POWER UP state and the temperature of the lubrication oil is less than the OIL TEMP WARM temperature. If it is not, the step proceeds to the CONTINUE block 14. If it is, the process block 22 sets the LOW OIL LEVEL indicator.

The fourth step of the method sets the LOW OIL LEVEL indicator if the temperature of the lubrication oil is greater than or equal to the OIL TEMP WARM temperature and the oil level of the lubrication oil is less than an ADD OIL RUNNING level if the gas turbine engine is in a RUN or COOLDOWN state. This step recognises that the measured level of lubrication oil during the RUN and COOLDOWN states will be less than the measured level of lubrication oil during the POWER UP or WATCH state following the POWER UP state due to circulation of the lubrication oil in the gas turbine engine during the RUN and COOLDOWN states. In other words, the ADD OIL RUNNING level will be at a lower level than the ADD OIL STATIC level. The lubrication oil level during the RUN and COOLDOWN states represents an accurate oil level because all the lubrication oil in the gas turbine engine circulates with no oil hiding. Referring to FIG. 1, a decision block 26 determines if the gas turbine engine is in the RUN or COOLDOWN state when not in the WATCH state. If it is not, the step proceeds to the CONTINUE block 14. If it is, a decision block 28 determines if the temperature of the lubrication oil is greater than or equal to the OIL TEMP WARM temperature. If it is, a decision block 30 determines if the oil level of the lubrication oil is at a height less than the ADD OIL RUNNING level. If it is not, the step proceeds to the CONTINUE block 20. If it is, the process step 22 sets the OIL LEVEL LOW indicator.

The fifth step of the method sets the LOW OIL LEVEL indicator if the temperature of the lubrication oil is less than the OIL TEMP WARM temperature and the oil level of the lubrication oil is less than an ADD OIL RUNNING COLD level if the gas turbine engine is in the RUN or COOLDOWN state. Again, this step recognises that the measured level of lubrication oil during the RUN and COOLDOWN states will be less than the measured level of lubrication oil during the POWER UP or WATCH state following the POWER UP state due to circulation of the lubrication oil in the gas turbine engine during the RUN and COOLDOWN states. It also recognises that the measured oil level will be lower than the fourth step due to shrinkage of the lubrication oil with decreasing temperature, that is, below the temperature of OIL TEMP WARM. In other words, the ADD OIL RUNNING COLD level will be at a lower level than the ADD OIL RUNNING as well as the ADD OIL STATIC COLD level. Thus, the OIL FILLED, ADD OIL STATIC, ADD OIL STATIC COLD, ADD OIL RUNNING and ADD OIL RUNNING COLD oil levels represent progressively lower levels of oil in the gas turbine engine in the described steps for indicating low oil level of lubrication oil for the gas turbine engine. Referring to FIG. 1, when the gas turbine engine is in the RUN or COOLDOWN state and the temperature of the lubrication oil is less than the OIL TEMP WARM temperature, a decision block 32 determines if the oil level of the lubrication oil is at a height less than the ADD OIL RUNNING COLD level. If it is not, the step proceeds to the CONTINUE block 14. If it is, the process block 22 sets the OIL LEVEL LOW indicator.

FIG. 2 is a high-level schematic diagram of a data processing system 34 for implementing the method of indicating low oil level of lubrication oil for a gas turbine engine 36 shown in FIG. 1. An oil level sensor 38 measures the level of lubrication oil for the gas turbine engine 4 in a gearbox sump 40 for the gas turbine engine 36. An oil temperature sensor 42 measures the temperature of the lubrication oil in the gearbox sump 40.

The oil level sensor 38 transmits a lubrication oil level signal to the data processing system 34 by way of an oil level output line 44 that is representative of the level of the lubrication oil that it measures. The oil temperature sensor 42 transmits a lubrication oil temperature signal to the data processing system 34 by way of an oil temperature output line 46 that is representative of the temperature of the lubrication oil in the gearbox sump 40.

The data processing system 34 may be a central processing unit (CPU) 48 coupled to a memory unit 50 by way of a two-way data bus 52. The memory unit 50 may be any sort of computer or CPU-readable media for storing instructions that carry out the described method of indicating low oil level of lubrication oil for the gas turbine engine 36, such as read-only memory (ROM), random-access memory (RAM), electrically erasable programmable read-only memory (EEPROM), flash memory, optical media such as any sort of optical data storage disc or magnetic media such as any sort of magnetic storage disc. Alternatively, the data processing system 34 may be an application-specific integrated circuit (ASIC) or programmable device that includes such CPU 48 and memory unit 50 functionality.

The CPU 48 also receives an engine state signal on an engine state output line 54 from an engine controller 56 that is representative of the current operating state of the gas turbine engine 36. Implementing instructions stored in the memory unit 50, the CPU 48 executes the described method of indicating low oil level of lubrication oil for the gas turbine engine 36 in response to the lubrication oil level signal on the oil level output line 44, the lubrication oil temperature signal on the oil temperature output line 46 and the engine state signal on the engine state output line 54 by setting or clearing a LOW OIL LEVEL indicator 58 by way of an indicator control signal on an indicator input line 60.

The described embodiments as set forth herein represents only some illustrative implementations of the invention as set forth in the attached claims. Changes and substitutions of various details and arrangement thereof are within the scope of the claimed invention.

The invention claimed is:

1. A method of indicating low oil level of lubrication oil for a gas turbine engine, comprising the steps of:
clearing a LOW OIL LEVEL indication if the oil level of the lubrication oil is at a level greater than or equal to an OIL FILLED level if the gas turbine engine is in a WATCH state;
setting the LOW OIL LEVEL indication if the temperature of the lubrication oil is greater than or equal to an OIL TEMP WARM temperature and the oil level of the lubrication oil is less than an ADD OIL STATIC level if the gas turbine engine is in the WATCH state and its previous state was a POWER UP state;
setting the LOW OIL LEVEL indication if the temperature of the lubrication oil is less than the OIL TEMP WARM temperature and the oil level of the lubrication oil is less than a ADD OIL STATIC COLD level if the gas turbine engine is in the WATCH state and its previous state was the POWER UP state;
setting the LOW OIL LEVEL indication if the temperature of the lubrication oil is greater than or equal to the OIL TEMP WARM temperature and the oil level of the lubrication oil is less than an ADD OIL RUNNING level if the gas turbine engine is in a RUN or COOLDOWN state; and
setting the LOW OIL LEVEL indication if the temperature of the lubrication oil is less than the OIL TEMP WARM temperature and the oil level of the lubrication oil is less than an ADD OIL RUNNING COLD level if the gas turbine engine is in the RUN or COOLDOWN state.

2. The method of claim 1, wherein the OIL FILLED, ADD OIL STATIC, ADD OIL STATIC COLD, ADD OIL RUNNING and ADD OIL RUNNING COLD oil levels represent progressively lower levels of oil in the gas turbine engine.

3. The method of claim 1, wherein the ADD OIL STATIC COLD oil level is lower than the ADD OIL STATIC due to shrinkage of the lubrication oil with decreasing temperature.

4. The method of claim 1, wherein the ADD OIL RUNNING COLD oil level is lower than the ADD OIL RUNNING oil level due to shrinkage of the lubrication oil with decreasing temperature.

5. The method of claim 1, wherein the ADD OIL RUNNING oil level is lower than the ADD OIL STATIC oil level due to circulation of the lubrication oil in the gas turbine engine in the RUN and COOLDOWN states.

6. The method of claim 1, wherein the ADD OIL RUNNING COLD oil level is lower than the ADD OIL STATIC COLD oil level due to circulation of the lubrication oil in the gas turbine engine in the RUN and COOLDOWN states.

7. The method of claim 1, wherein the OIL TEMP WARM temperature represents a normal operating temperature of the lubrication oil.

8. The method of claim 1, wherein the operating states are sequentially the POWER UP, WATCH, RUN, COOLDOWN, SHUTDOWN and WATCH operating states.

9. A method of indicating low oil level of lubrication oil for a gas turbine engine that includes sequential operating states of POWER UP, WATCH, RUN, COOLDOWN, SHUTDOWN and WATCH, with oil levels OIL FILLED, ADD OIL STATIC, ADD OIL STATIC COLD, ADD OIL RUNNING and ADD OIL RUNNING COLD representing progressively lower levels of oil in the gas turbine engine, comprising the steps of:
  clearing a LOW OIL LEVEL indication if the oil level of the lubrication oil is at a level greater than or equal to the OIL FILLED level if the gas turbine engine is in the WATCH state;
  setting the LOW OIL LEVEL indication if the temperature of the lubrication oil is greater than or equal to an OIL TEMP WARM temperature and the oil level of the lubrication oil is less than the ADD OIL STATIC level if the gas turbine engine is in the WATCH state and its previous state was the POWER UP state;
  setting the LOW OIL LEVEL indication if the temperature of the lubrication oil is less than the OIL TEMP WARM temperature and the oil level of the lubrication oil is less than the ADD OIL STATIC COLD level if the gas turbine engine is in the WATCH state and its previous state was the POWER UP state;
  setting the LOW OIL LEVEL indication if the temperature of the lubrication oil is greater than or equal to the OIL TEMP WARM temperature and the oil level of the lubrication oil is less than the ADD OIL RUNNING level if the gas turbine engine is in the RUN or COOLDOWN state; and
  setting the LOW OIL LEVEL indication if the temperature of the lubrication oil is less than the OIL TEMP WARM temperature and the oil level of the lubrication oil is less than the ADD OIL RUNNING COLD level if the gas turbine engine is in the RUN or COOLDOWN state.

10. The method of claim 9, wherein the OIL TEMP WARM temperature represents a normal operating temperature of the lubrication oil.

11. A data processing unit for storing instructions to indicate low oil level of lubrication oil for a gas turbine engine, comprising:
  instructions to clear a LOW OIL LEVEL indication if the oil level of the lubrication oil is at a level greater than or equal to an OIL FILLED level if the gas turbine engine is in a WATCH state;
  instructions to set the LOW OIL LEVEL indication if the temperature of the lubrication oil is greater than or equal to an OIL TEMP WARM temperature and the oil level of the lubrication oil is less than an ADD OIL STATIC level if the gas turbine engine is in the WATCH state and its previous state was a POWER UP state;
  instructions to set the LOW OIL LEVEL indication if the temperature of the lubrication oil is less than the OIL TEMP WARM temperature and the oil level of the lubrication oil is less than an ADD OIL STATIC COLD level if the gas turbine engine is in the WATCH state and its previous state was the POWER UP state;
  instructions to set the LOW OIL LEVEL indication if the temperature of the lubrication oil is greater than or equal to the OIL TEMP WARM temperature and the oil level of the lubrication oil is less than an ADD OIL RUNNING level if the gas turbine engine is in a RUN or COOLDOWN state; and
  instructions to set the LOW OIL LEVEL indication if the temperature of the lubrication oil is less than the OIL TEMP WARM temperature and the oil level of the lubrication oil is less than a ADD OIL RUNNING COLD level if the gas turbine engine is in the RUN or COOLDOWN state.

12. The data processing unit of claim 11 wherein the OIL FILLED, ADD OIL STATIC, ADD OIL STATIC COLD, ADD OIL RUNNING and ADD OIL RUNNING COLD oil levels represent progressively lower levels of oil in the gas turbine engine.

13. The data processing unit of claim 11 wherein the ADD OIL STATIC COLD oil level is lower than the ADD OIL STATIC due to shrinkage of the lubrication oil with decreasing temperature.

14. The data processing unit of claim 11 wherein the ADD OIL RUNNING COLD oil level is lower than the ADD OIL RUNNING oil level due to shrinkage of the lubrication oil with decreasing temperature.

15. The data processing unit of claim 11 wherein the ADD OIL RUNNING oil level is lower than the ADD OIL STATIC oil level due to circulation of the lubrication oil in the gas turbine engine in the RUN and COOLDOXX/N states.

16. The data processing unit of claim 11 wherein the ADD OIL RUNNING COLD oil level is lower than the ADD OIL STATIC COLD oil level due to circulation of the lubrication oil in the gas turbine engine in the RUN and COOLDOXX/N states.

17. The data processing unit of claim 11 wherein the OIL TEMP WARM temperature represents a normal operating temperature of the lubrication oil.

18. A data processing unit for storing instructions to indicate low oil level of lubrication oil for a gas turbine engine that includes sequential operating states of POWER UP, WATCH, RUN, COOLDOWN, SHUTDOWN and WATCH, with oil levels OIL FILLED, ADD OIL STATIC, ADD OIL STATIC COLD, ADD OIL RUNNING and ADD OIL RUNNING COLD representing progressively lower levels of oil in the gas turbine engine, comprising:
  instructions to clear a LOW OIL LEVEL indication if the oil level of the lubrication oil is at a level greater than or equal to the OIL FILLED level if the gas turbine engine is in the WATCH state;
  instructions to set the LOW OIL LEVEL indication if the temperature of the lubrication oil is greater than or equal to an OIL TEMP WARM temperature and the oil level of the lubrication oil is less than the ADD OIL STATIC level if the gas turbine engine is in the WATCH state and its previous state was the POWER UP state;
  instructions to set the LOW OIL LEVEL indication if the temperature of the lubrication oil is less than the OIL TEMP WARM temperature and the oil level of the lubrication oil is less than the ADD OIL STATIC COLD level if the gas turbine engine is in the WATCH state and its previous state was the POWER UP state;
  instructions to set the LOW OIL LEVEL indication if the temperature of the lubrication oil is greater than or equal to the OIL TEMP WARM temperature and the oil level of the lubrication oil is less than the ADD OIL RUNNING level if the gas turbine engine is in the RUN or COOLDOWN state; and
  instructions to set the LOW OIL LEVEL indication if the temperature of the lubrication oil is less than the OIL TEMP WARM temperature and the oil level of the lubrication oil is less than the ADD OIL RUNNING COLD level if the gas turbine engine is in the RUN or COOLDOWN state.

19. The data processing unit of claim 18, wherein the OIL FILLED, ADD OIL STATIC, ADD OIL STATIC COLD, ADD OIL RUNNING and ADD OIL RUNNING COLD oil levels represent progressively lower levels of oil in the gas turbine engine.

20. The data processing unit of claim 18, wherein the OIL TEMP WARM temperature represents a normal operating temperature of the lubrication oil.

21. The data processing unit of claim 18, wherein the operating states are sequentially the POWER UP, WATCH, RUN, COOLDOWN, SHUTDOWN and WATCH operating states.

* * * * *